US012506186B2

(12) United States Patent
Kim et al.

(10) Patent No.: US 12,506,186 B2
(45) Date of Patent: Dec. 23, 2025

(54) BATTERY SYSTEM FOR VEHICLE

(71) Applicants: Hyundai Motor Company, Seoul (KR); Kia Corporation, Seoul (KR); FINE PowerX Corporation, Ulsan (KR); FINE INC., Busan (KR)

(72) Inventors: Jae Uk Kim, Asan-si (KR); Byung Duk Min, Ulsan (KR); Jin Ha Choi, Yongin-si (KR); Sang Joon Lee, Busan (KR)

(73) Assignees: HYUNDAI MOTOR COMPANY, Seoul (KR); KIA CORPORATION, Seoul (KR); FINE POWERX CORPORATION, Ulsan (KR); FINE INC., Busan (KR)

( * ) Notice: Subject to any disclaimer, the term of this patent is extended or adjusted under 35 U.S.C. 154(b) by 639 days.

(21) Appl. No.: 17/891,804

(22) Filed: Aug. 19, 2022

(65) Prior Publication Data

US 2023/0137617 A1    May 4, 2023

(30) Foreign Application Priority Data

Nov. 1, 2021    (KR) .................. 10-2021-0148295

(51) Int. Cl.
| | |
|---|---|
| *H01M 10/42* | (2006.01) |
| *H01M 10/48* | (2006.01) |
| *H01M 50/204* | (2021.01) |
| *H01M 50/24* | (2021.01) |
| *H01M 50/249* | (2021.01) |
| *H01M 50/284* | (2021.01) |
| *H01M 50/519* | (2021.01) |
| *H02J 7/00* | (2006.01) |

(Continued)

(52) U.S. Cl.
CPC ..... *H01M 10/4257* (2013.01); *H01M 10/482* (2013.01); *H01M 10/486* (2013.01); *H01M 50/204* (2021.01); *H01M 50/24* (2021.01); *H01M 50/249* (2021.01); *H01M 50/284* (2021.01); *H01M 50/519* (2021.01); *H02J 7/00032* (2020.01); *H02J 7/0013* (2013.01); *B60L 50/64* (2019.02); *H01M 2010/4271* (2013.01); *H01M 2220/20* (2013.01); *H04B 1/38* (2013.01)

(58) Field of Classification Search
CPC ........... H01M 10/4257; H01M 50/249; H01M 50/24; H01M 50/519; H01M 50/204
See application file for complete search history.

(56) References Cited

U.S. PATENT DOCUMENTS

2017/0351561 A1* 12/2017 Yamazoe ............ G06F 11/0745
2021/0239539 A1*  8/2021 Smitherman ............ G01K 1/16
(Continued)

FOREIGN PATENT DOCUMENTS

KR    20110024307 A    3/2011

*Primary Examiner* — Olatunji A Godo
(74) *Attorney, Agent, or Firm* — SLATER MATSIL, LLP

(57) ABSTRACT

An embodiment battery system includes a battery module comprising a plurality of battery cells, an analog-to-digital (A/D) converter configured to convert voltages of the battery cells to digital signals, a first wireless communication module configured to wirelessly transmit an output signal of the A/D converter, and a battery management unit comprising a second wireless communication module configured to receive a wireless signal transmitted from the first wireless communication module.

16 Claims, 6 Drawing Sheets

(51) Int. Cl.
 *B60L 50/64* (2019.01)
 *H04B 1/38* (2015.01)

(56) References Cited

U.S. PATENT DOCUMENTS

2023/0144618 A1* 5/2023 Togo .................. A61B 5/14551
                                                        600/300
2023/0155401 A1* 5/2023 Kuranuki ............... H01G 11/08

* cited by examiner

BATTERY SYSTEM FOR VEHICLE

CROSS-REFERENCE TO RELATED APPLICATIONS

This application claims the benefit of Korean Patent Application No. 10-2021-0148295, filed on Nov. 1, 2021, which application is hereby incorporated herein by reference.

TECHNICAL FIELD

The present disclosure relates to a technology regarding a battery system mounted to a vehicle.

BACKGROUND

A hybrid vehicle or an electric vehicle may be equipped with a battery system including battery modules, each of which includes multiple battery cells.

The battery system may include a battery management unit (BMU) to calculate, based on information about voltages and temperatures of battery cells constituting each battery module, whether the battery cells are abnormal and the state of charge (SOC), the state of health (SOH), etc. of the battery.

The above descriptions regarding background technologies have been made only to help understanding of the background of the present disclosure, and are not to be deemed by those skilled in the art to correspond to already known prior art.

SUMMARY

An embodiment of the present disclosure provides a battery system for a vehicle, which effectively transmits information, such as the temperature of a battery module and the voltage of each of the battery cells constituting the battery module, to a BMU while avoiding a complex connection structure of multiple cables and connectors, and thus may reduce the complexity of the battery system to enable improvement in assembly and reduction in production cost, may have a reduced weight to contribute to improvement of fuel efficiency of the vehicle, and may prevent the reliability of information from being reduced by contact failures of connectors, or the like.

In accordance with an embodiment of the present disclosure, a battery system for a vehicle may include an A/D converter configured to convert voltages of battery cells constituting a battery module to digital signals, a first wireless communication module disposed to wirelessly transmit an output signal of the A/D converter, and a BMU including a second wireless communication module configured to receive a wireless signal transmitted from the first wireless communication module.

The A/D converter may also be configured to convert, to a digital signal, a measurement value of a temperature sensor configured to measure the temperature of the battery module.

In the battery module, multiple battery cells may be stacked in a straight line direction, sensing boards may be disposed at both ends of the battery cells, respectively, so as to make electrical contact with the battery cells, and the two sensing boards may be connected to each other by an electrical connector installed to be elongated in a direction perpendicular to the straight line direction.

The A/D converter and the first wireless communication module may be arranged at only one of the two sensing boards.

The electrical connector may be a flexible PCB.

Multiple battery modules may be arranged, and the second wireless communication module of the BMU may be configured to communicate with each of first wireless communication modules of the battery modules.

The first wireless communication modules of the battery modules may be disposed toward a central portion of a battery case, and the second wireless communication module of the BMU may also be disposed toward the central portion of the battery case.

The first wireless communication modules of the battery modules may be arranged in a row while facing each other such that a space surrounded by the first wireless communication modules is formed between the battery modules. A second wireless communication module of the BMU may be disposed to face the space surrounded by the first wireless communication modules.

The multiple battery modules and the BMU may be arranged in an identical space in the battery case, and an electromagnetic wave blocking shield wrapped around the multiple battery modules and the BMU together may be disposed in the battery case.

The first wireless communication module may be configured to transmit cell voltage data and temperature data, which have been output from the A/D converter, to a wireless communication unit, and may include an MCU configured to control the battery module.

Embodiments of the present disclosure may effectively transmit information, such as the temperature of a battery module and voltages of battery cells constituting the battery module, to a BMU while avoiding a complex connection structure of multiple cables and connectors, and thus may reduce the complexity of a battery system to enable improvement in assembly and reduction in production cost, may have a reduced weight to contribute to improvement of the fuel efficiency of a vehicle, and may prevent the reliability of information from being reduced by contact failures of connectors, or the like.

BRIEF DESCRIPTION OF THE DRAWINGS

The above and other aspects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
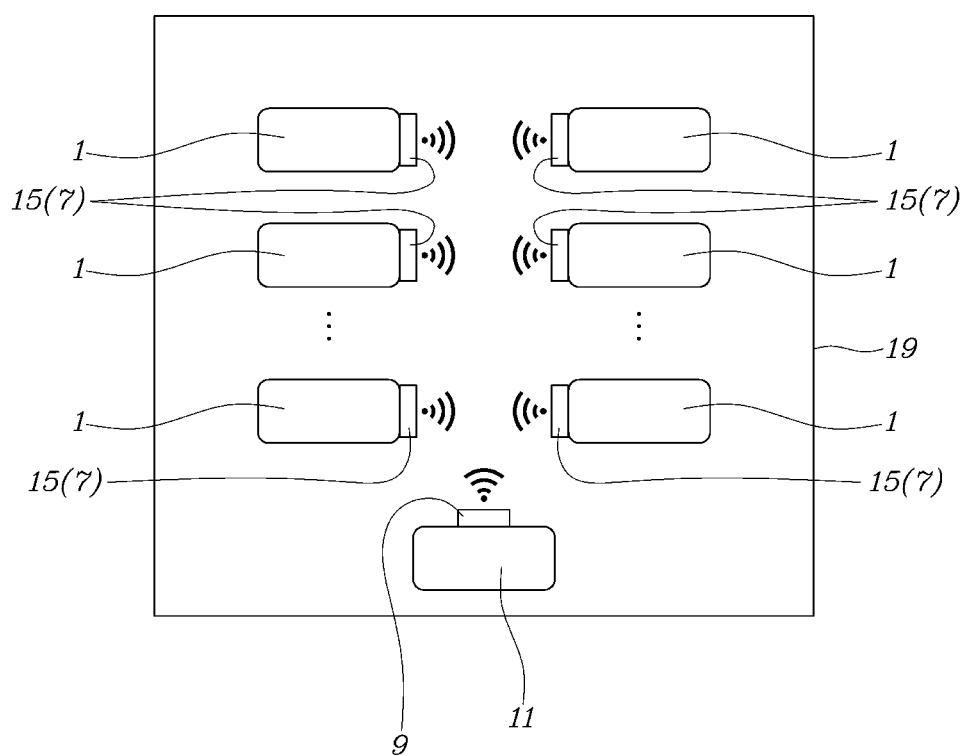
FIG. 1 illustrates the structure of a battery system for a vehicle according to embodiments of the present disclosure.
Figure 2:
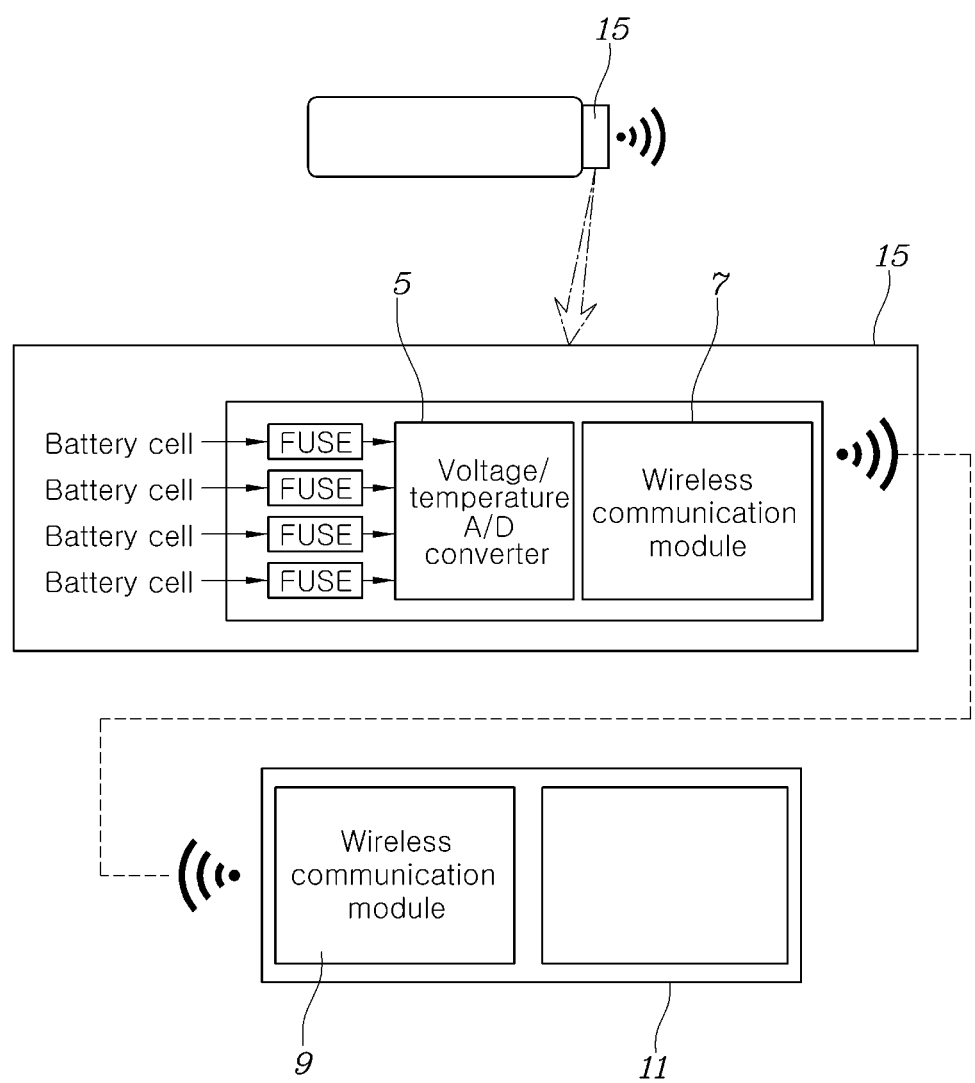
FIG. 2 illustrates the configuration of the sensing board and the BMU in FIG. 1 in detail.

A specific structural or functional description of embodiments of the present disclosure disclosed in the specification or application is given merely for the purpose of describing the embodiments according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a first element without departing from the scope of protection of the present disclosure.

In the case where an element is referred to as being "connected" or "coupled" to other elements, it should be understood that not only the element is directly connected or coupled to the other elements, but also another element may exist between them. Contrarily, in the case where a component is referred to as being "directly connected" or "directly coupled" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless it is definitely different in context. As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. In the respective drawings, identical or like reference signs denote identical or like components.

Referring to FIGS. 1 to 6, a battery system for a vehicle, according to an embodiments of the present disclosure, may include an analog-digital converter (A/D converter) 5 configured to convert voltages of battery cells 3 constituting a battery module 1 to digital signals, a first wireless communication module 7 disposed to wirelessly transmit an output signal of the A/D converter 5, and a battery management unit (BMU) ii including a second wireless communication module 9 configured to receive a wireless signal transmitted from the first wireless communication module 7.

That is, in embodiments of the present disclosure, when voltages of the battery cells 3 of the battery module 1 are wirelessly transmitted as digital signals, the BMU 11 may wirelessly receive the digital signals to recognize the voltages of the battery cells 3 and the battery module 1.

The A/D converter 5 may also be configured to convert, to a digital signal, a measurement value of a temperature sensor 13 for measuring the temperature of the battery module 1.

That is, the battery module 1 may include the temperature sensor 13 for measuring the temperature of the battery module 1, wherein information on a temperature measured by the temperature sensor 13 may also be converted to a digital signal through the A/D converter 5, and may be transmitted to the BMU 11 through the first wireless communication module 7 and the second wireless communication module 9, whereby the BMU 11 may accurately recognize and control temperatures of the battery modules 1 constituting the battery system.

For reference, at least two temperature sensors 13 may be installed in one battery module 1, and a value measured by each temperature sensor 13 may be separately converted by the A/D converter 5, and may be transmitted to the first wireless communication module 7.

As described above, data on the temperature of each battery module 1 and voltages of the battery cells 3 constituting each battery module 1 may be wirelessly transmitted to the BMU 11, and thus physical wiring may not be needed between the BMU 11 and the battery cells 3 of the battery module 1, and a connector structure or the like needed for the above-described physical wiring may be avoided. Therefore, the battery system may have improvements in assembly and reductions in production costs, may have a reduced weight to contribute to improvement of the fuel efficiency of a vehicle, and may prevent the reliability of information from being reduced by contact failure of connectors, or the like.

Figure 3:
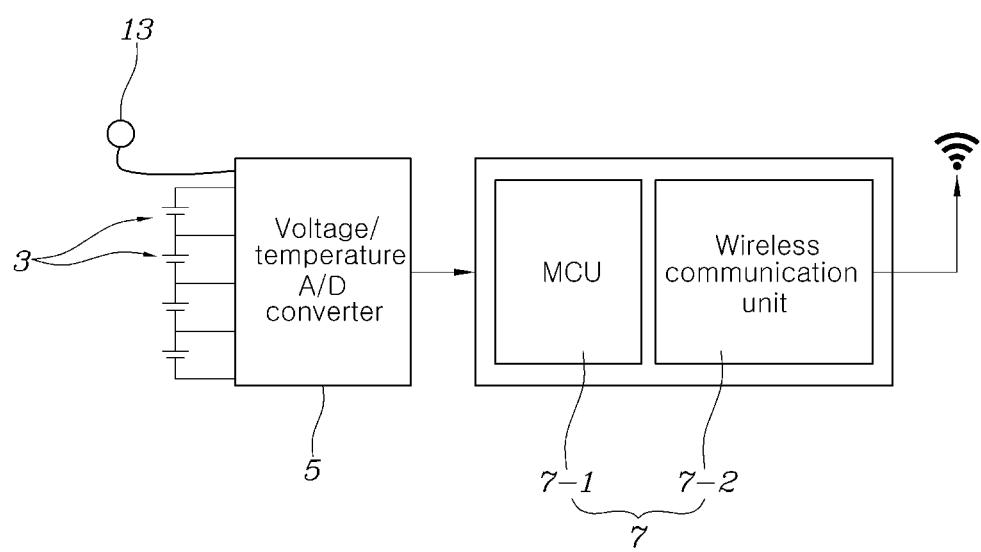
FIG. 3 illustrates the configuration of the sensing board in FIG. 1 in detail.

For reference, as illustrated in FIG. 3, the first wireless communication module 7 may be configured to transmit cell voltage data and temperature data, which have been output from the A/D converter 5, to a wireless communication unit 7-2 and to include a micro control unit (MCU)7-1 configured to control the battery module 1.

In the battery module 1, multiple battery cells 3 may be stacked in a straight line direction, sensing boards 15 are disposed at both ends of the battery cells 3, respectively, so as to make electrical contact with the battery cells 3, and the two sensing boards 15 may be connected to each other by an electrical connector 17 installed to be elongated in a direction perpendicular to the straight line direction.

Figure 5:
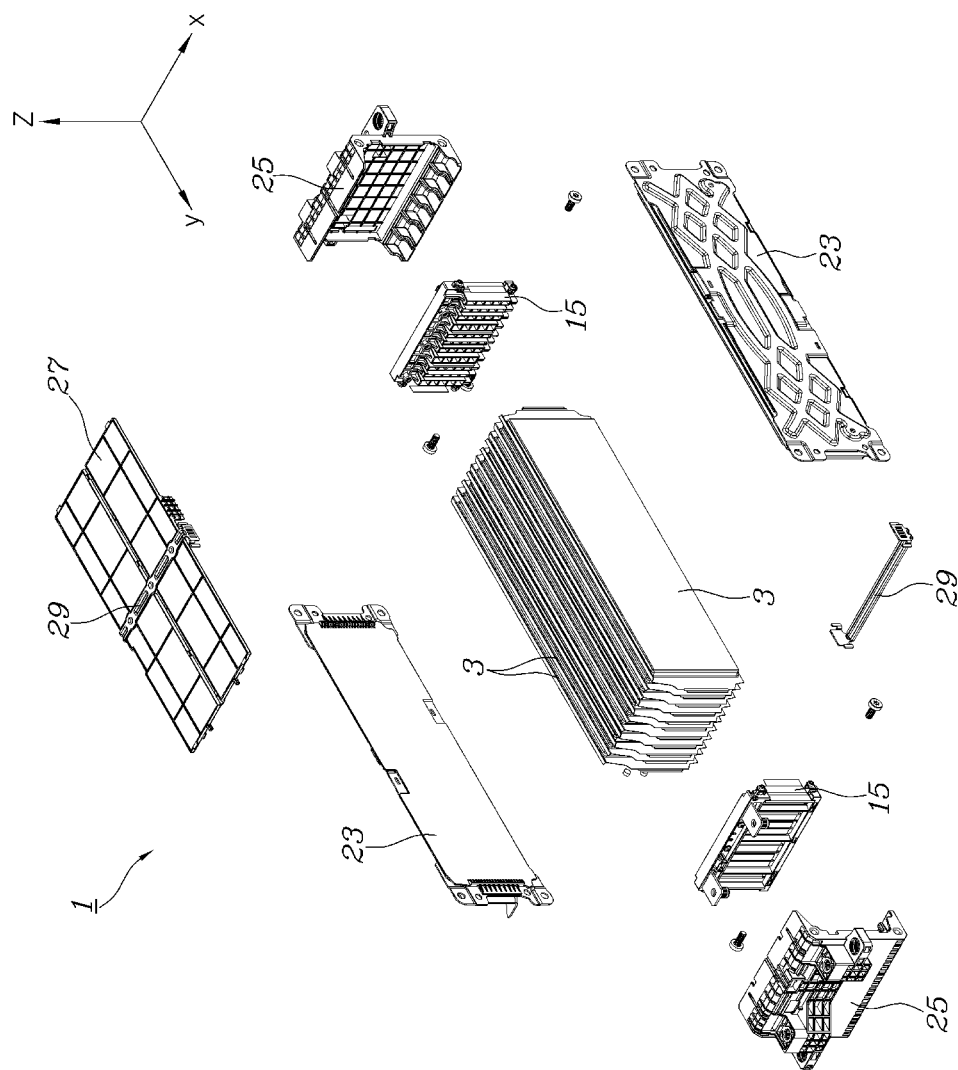
FIG. 5 illustrates the configuration of each battery module.
Figure 6:
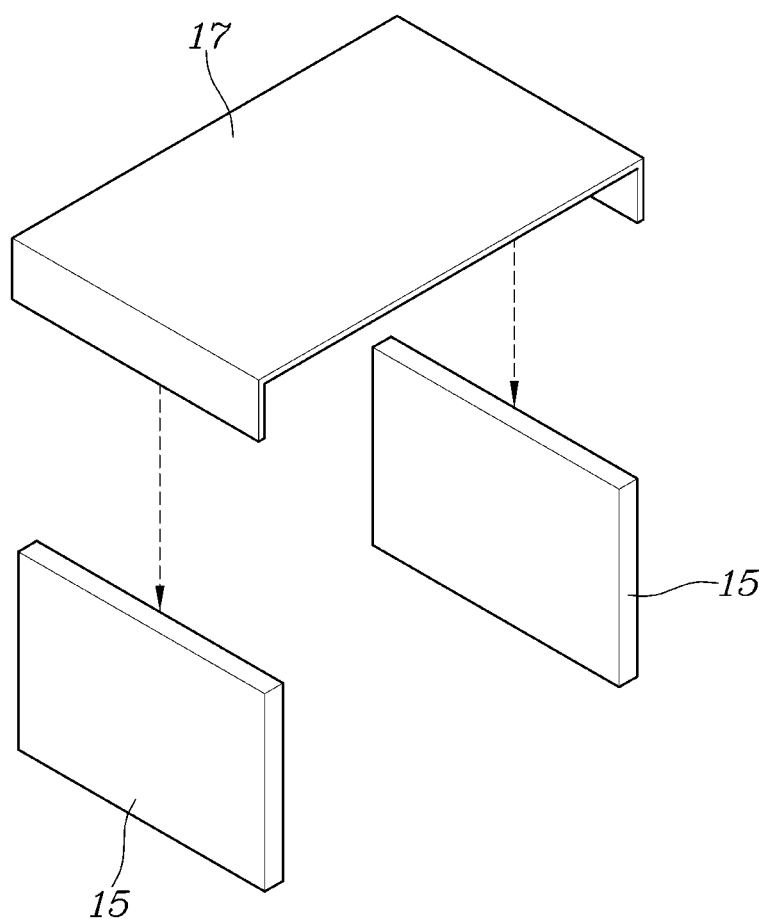
FIG. 6 illustrates a flexible PCB which is an electrical connector for connecting two sensing boards of a battery module.

That is, as illustrated in FIG. 5, the battery cells 3 may be stacked in the X direction, and the sensing boards 15 may be disposed at both ends of the battery cells 3, i.e., both ends in the Y direction, respectively, and connected to an electrode of each battery cell 3. Further, as illustrated in FIG. 6, the electrical connector 17 may be provided to connect the sensing boards 15, disposed at both ends of the battery cells 3, to each other.

The electrical connector 17 may be needed because the A/D converter 5 and the first wireless communication module 7 are arranged at only one of the two sensing boards 15.

That is, electrodes of both ends of each battery cell 3 need to be connected to the A/D converter 5, but each of the sensing boards 15 may be directly connected to only an electrode installed at one of both sides of the battery cell 3. Therefore, the electrical connector 17 may be provided to connect an electrode installed at the other side of the battery cell 3 to the A/D converter 5.

The electrical connector 17 may be formed of a flexible PCB.

When the battery cells 3 constituting the battery module 1 are one-way cells which have electrodes protruding only in one direction, the electrical connector 17 as described above may be excluded, and the A/D converter 5 and the first wireless communication module 7 may be arranged on the sensing board 15 installed at a side at which electrodes of the battery cells 3 protrude.

For reference, FIG. 5 illustrates, as components constituting the battery module 1, two endplates 23 for supporting both ends of the stacked battery cells 3, side covers 25, which cover and support the outsides of the sensing boards 15 and include flanges for fixing the battery module 1, an upper cover 27 covering the top of the battery module 1, and a clamp 29 for pressing and supporting the battery cells 3 in the stacked direction, together.

As described above, in the system of embodiments of the present disclosure, multiple battery modules 1 may be arranged, and the second wireless communication module 9 of the BMU 11 may be configured to communicate with each of first wireless communication modules 7 of the battery modules 1.

That is, the BMU 11 may be configured to receive data on the temperature of each battery module 1 and data on the voltage of the battery cells 3 constituting each battery module 1 through wireless communication with the first wireless communication modules 7 of all battery modules 1 constituting the battery system through the second wireless communication module 9 and calculate, based on the data, whether the battery cells 3 are abnormal and the state of charge (SOC), the state of health (SOH), or the like of the battery system.

Figure 4:
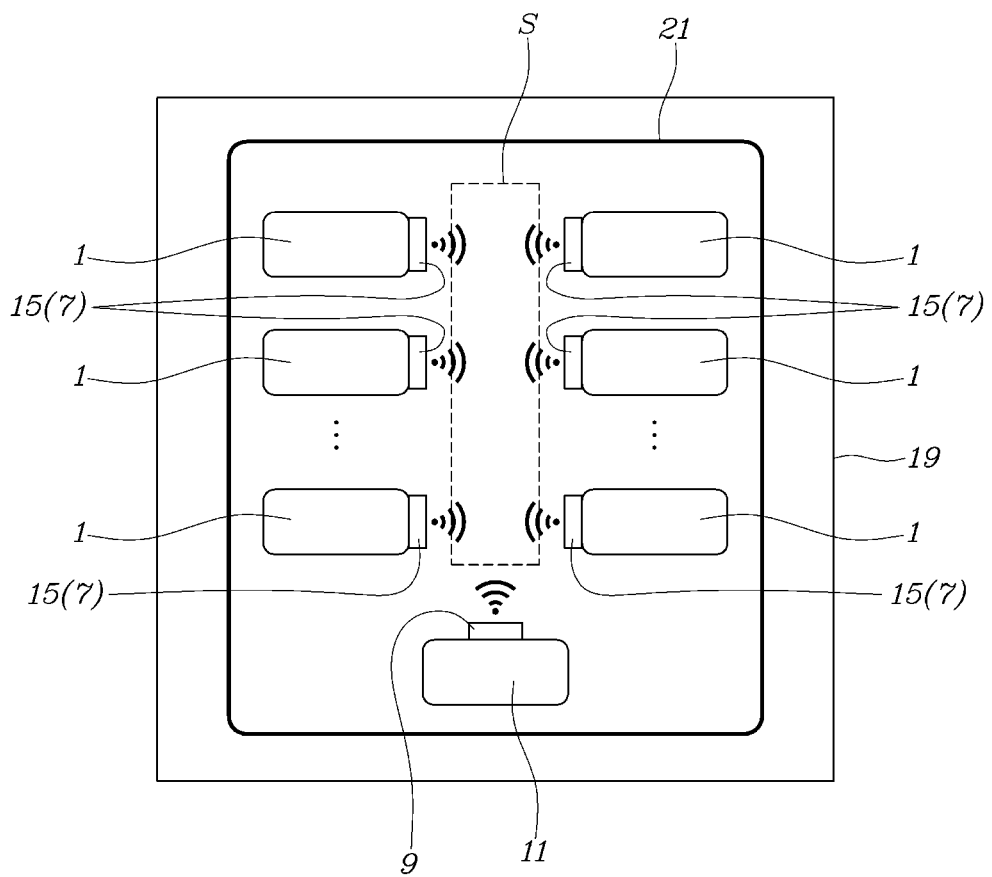
FIG. 4 illustrates an electromagnetic wave blocking shield disposed in a battery case.

Referring to FIG. 4, the first wireless communication modules 7 of the battery modules 1 may be disposed toward the central portion of a battery case 19, and the second wireless communication module 9 of the BMU 11 may also be disposed toward the central portion of the battery case 19.

That is, the first wireless communication modules 7 of the battery modules 1 may be arranged in a row while facing each other such that a space S surrounded by the first wireless communication modules 7 is formed between the battery modules 1, and the second wireless communication module 9 of the BMU 11 may be disposed to face the space S surrounded by the first wireless communication modules 7.

Therefore, a failure in wireless communication between the first wireless communication modules 7 and the second wireless communication module 9 may be prevented from being caused by electromagnetic wave shielding by components which are made of metal such as steel or aluminum and may be placed between the battery modules 1 or between the battery modules 1 and the BMU 11 in the battery case 19, and thus a smooth wireless communication environment may be always ensured.

Furthermore, the multiple battery modules 1 and the BMU 11 may be arranged in an identical space in the battery case 19 such that the above-described environment for wireless communication having no failure is more easily ensured. Further, an electromagnetic wave blocking shield 21 wrapped around both the multiple battery modules 1 and the BMU 11 may be disposed in the battery case 19.

That is, the electromagnetic wave blocking shield 21 may prevent jamming from being caused in wireless communication between the first wireless communication module 7 of each of the battery modules 1 and the second wireless communication module 9 of the BMU 11 by signals transmitted from external adjacent other devices or vehicles. In addition, the electromagnetic wave blocking shield 21 may prevent wireless communication between the first wireless communication modules 7 and the second wireless communication module 9 from causing unnecessary jamming with respect to other devices of the vehicle.

The electromagnetic wave blocking shield 21 may be installed at the inside or the outside of the battery case 19 in a form in which both the first wireless communication module 7 and the second wireless communication module 9 are wrapped in a metal panel or the like.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A battery system comprising:
a battery module comprising a plurality of battery cells;
an analog-to-digital (A/D) converter configured to convert voltages of the battery cells to digital signals;
a first wireless communication module configured to wirelessly transmit an output signal of the A/D converter; and
a battery management unit (BMU) comprising a second wireless communication module configured to receive a wireless signal transmitted from the first wireless communication module,
wherein:
the battery module comprises:
the plurality of battery cells stacked in a straight line direction;
a pair of sensing boards disposed at both ends of the plurality of battery cells, respectively, so as to make electrical contact with the plurality of battery cells; and
an electrical connector disposed to be elongated in a direction perpendicular to the straight line direction, the electrical connector connecting the pair of sensing boards to each other,
a plurality of first wireless communication modules are included in the battery system,
the plurality of first wireless communication modules are arranged in a row while facing each other such that a space surrounded by the plurality of first wireless communication modules is defined between a plurality of battery modules comprising the battery module, and
the second wireless communication module of the BMU is disposed to face the space surrounded by the plurality of first wireless communication modules.

2. The battery system of claim 1, wherein the A/D converter is configured to convert, to a digital signal, a measurement value of a temperature sensor configured to measure a temperature of the battery module.

3. The battery system of claim 2, wherein the A/D converter and the first wireless communication module are arranged at only one of the pair of sensing boards.

4. The battery system of claim 2, wherein the electrical connector comprises a flexible printed circuit board.

5. The battery system of claim 2, wherein the first wireless communication module is configured to transmit cell voltage data and temperature data output from the A/D converter to a wireless communication unit.

6. The battery system of claim 5, wherein the first wireless communication module comprises a micro control unit configured to control the battery module.

7. A battery system comprising:
a plurality of battery modules, each battery module comprising:
　a plurality of battery cells stacked in a straight line direction;
　a pair of sensing boards disposed at both ends of the plurality of battery cells, respectively, so as to make electrical contact with the plurality of battery cells; and
　an electrical connector disposed to be elongated in a direction perpendicular to the straight line direction, the electrical connector connecting the pair of sensing boards to each other;
an analog-to-digital (A/D) converter configured to:
　convert voltages of the plurality of battery cells to digital signals; and
　convert, to a digital signal, a measurement value of a temperature sensor configured to measure a temperature of respective battery modules of the plurality of battery modules;
first wireless communication modules configured to wirelessly transmit an output signal of the A/D converter; and
a battery management unit (BMU) comprising a second wireless communication module configured to receive a wireless signal transmitted from the first wireless communication modules, the second wireless communication module being configured to communicate with each of the first wireless communication modules,
wherein:
　the first wireless communication modules are arranged in a row while facing each other such that a space surrounded by the first wireless communication modules is defined between the plurality of battery modules; and
　the second wireless communication module of the BMU is disposed to face the space surrounded by the first wireless communication modules.

8. The battery system of claim 7, wherein:
the first wireless communication modules are disposed toward a central portion of a battery case; and
the second wireless communication module is disposed toward the central portion of the battery case.

9. The battery system of claim 7, wherein:
the battery modules and the BMU are arranged in an identical space in a battery case; and
an electromagnetic wave blocking shield wrapped around the battery modules and the BMU is disposed in the battery case.

10. A vehicle comprising:
a vehicle body;
a battery module coupled to the vehicle body, the battery module comprising a plurality of battery cells;
an analog-to-digital (A/D) converter configured to convert voltages of the battery cells to digital signals;
a first wireless communication module configured to wirelessly transmit an output signal of the A/D converter; and
a battery management unit (BMU) comprising a second wireless communication module configured to receive a wireless signal transmitted from the first wireless communication module,
wherein:
　the battery module comprises:
　　the plurality of battery cells stacked in a straight line direction;
　　a pair of sensing boards disposed at both ends of the plurality of battery cells, respectively, so as to make electrical contact with the plurality of battery cells; and
　　an electrical connector disposed to be elongated in a direction perpendicular to the straight line direction, the electrical connector connecting the pair of sensing boards to each other,
　a plurality of first wireless communication modules are included in a battery system of the vehicle,
　the plurality of first wireless communication modules are arranged in a row while facing each other such that a space surrounded by the plurality of first wireless communication modules is defined between a plurality of battery modules comprising the battery module, and
　the second wireless communication module of the BMU is disposed to face the space surrounded by the plurality of first wireless communication modules.

11. The vehicle of claim 10, wherein the A/D converter is configured to convert, to a digital signal, a measurement value of a temperature sensor configured to measure a temperature of the battery module.

12. The vehicle of claim 11, wherein the A/D converter and the first wireless communication module are arranged at only one of the pair of sensing boards.

13. The vehicle of claim 11, wherein the electrical connector comprises a flexible printed circuit board.

14. The vehicle of claim 11, further comprising:
the plurality of battery modules,
wherein the second wireless communication module of the BMU is configured to communicate with each of the plurality of first wireless communication modules.

15. The vehicle of claim 14, wherein:
the plurality of first wireless communication modules are disposed toward a central portion of a battery case; and
the second wireless communication module of the BMU is disposed toward the central portion of the battery case.

16. The vehicle of claim 14, wherein:
the plurality of battery modules and the BMU are arranged in an identical space in a battery case; and
an electromagnetic wave blocking shield wrapped around the plurality of battery modules and the BMU is disposed in the battery case.

* * * * *